(12) United States Patent
Jeong

(10) Patent No.: US 7,454,524 B2
(45) Date of Patent: Nov. 18, 2008

(54) METHOD AND APPARATUS FOR DOMAIN HOSTING BY USING LOGO DOMAIN

(76) Inventor: Yong-Seok Jeong, 778-4 Jayang 1-dong, Kwangjin-ku, Seoul 143-191 (KR)

( * ) Notice: Subject to any disclaimer, the term of this patent is extended or adjusted under 35 U.S.C. 154(b) by 1109 days.

(21) Appl. No.: 10/250,532

(22) PCT Filed: Jan. 5, 2002

(86) PCT No.: PCT/KR02/00017

§ 371 (c)(1),
(2), (4) Date: Aug. 18, 2003

(87) PCT Pub. No.: WO02/054274

PCT Pub. Date: Jul. 11, 2002

(65) Prior Publication Data

US 2004/0225722 A1    Nov. 11, 2004

(30) Foreign Application Priority Data

Jan. 6, 2001 (KR) .......................... 2001-0000879
Mar. 30, 2001 (KR) .......................... 2001-0016920

(51) Int. Cl.
*G06F 15/16* (2006.01)
(52) U.S. Cl. ...................... 709/245; 709/218
(58) Field of Classification Search ................. 709/250, 709/245, 217, 218; 345/764; 707/3; 385/229
See application file for complete search history.

(56) References Cited

U.S. PATENT DOCUMENTS 6,269,189 B1 * 7/2001 Chanod ...................... 382/229
7,000,028 B1 * 2/2006 Broadhurst et al. ......... 709/245
7,200,640 B1 * 4/2007 Cole et al. ................... 709/217
7,200,683 B1 * 4/2007 Wang et al. ................. 709/250
2002/0099693 A1 * 7/2002 Kofsky .......................... 707/3
2002/0154167 A1 * 10/2002 Parsons et al. .............. 345/764

FOREIGN PATENT DOCUMENTS

| KR | 1998-064882 | 10/1998 |
| KR | 1999-0068686 | 9/1999 |
| KR | 1999-0072311 | 9/1999 |
| KR | 2000-0066913 | 11/2000 |

OTHER PUBLICATIONS

International Search Report for International Application No. PCT/KR02/00017; Apr. 19, 2002.

* cited by examiner

*Primary Examiner*—Jungwon Chang
(74) *Attorney, Agent, or Firm*—Cantor Colburn LLP

(57) ABSTRACT

The present invention relates to logo domain hosting method and apparatus connecting directly to a domain address by using logo. The logo domain hosting method comprises the steps of receiving a domain request signal from a domain requester, wherein the domain request signal comprises a logo, registering the logo as a logo domain, transmitting a logo domain register confirmation signal corresponding to the registered logo domain, transmitting a classified code corresponding to the logo selected by an internet user to a domain name server, extracting an IP address corresponding to the classified code and providing the IP address with the internet user.

37 Claims, 18 Drawing Sheets

FIG. 10A

| area classification code 2~3 characters | secondary mark | service classification code 1~5 characters | secondary mark | proper number 4~7 characters | secondary mark |
|---|---|---|---|---|---|
| Korea 01 | kr | medical science 012 | med | Kang-Nam hospital 1234 | kn_hospital |
| China 02 | cn | education 021 | edu | Beijing University 4256 | buk_univ |
| the United States of America 03 | us | art 041 | art | madonna 1256 | m_snger |
| England 04 | uk | science 061 | scn | National Science Museum 4224 | uk_sc |
| Japan 05 | jp | government 171 | gov | Japanese National Diet 2587 | jp_ase |

FIG. 10B

| logo | name | cassification code number | secondary mark |
|------|------|---------------------------|----------------|
| ☞ | Korea auction | 01-424-4989 | kr-sale-auction |
| ♥ | Korea wedding | 01-424-1004 | kr-sale-wedding |
| ? | American consulting | 03-271-0114 | us-biz-consulting |
| ♨ | Korea spa | 01-154-4925 | kr-hw-water |

FIG. 10C

Σ   statistics and research logo

☎   communication company logo

♪   music logo kg  scale company logo cal scale company logo

@   Internet company logo

※   billiards site logo

₩   bank logo

FIG. 11B

| | |
|---|---|
| arpa | using in a mapping of an address and a name by using a special domain |
| com | commercial organization |
| edu | education organization and university |
| org | not-profit organization |
| net | network |
| gov | nonmilitary government organization |
| mil | military government organization |

FIG. 14

| | |
|---|---|
| Identification: [ ]<br>Password: [ ]<br><br>Banner<br>aboverisement | photo site, astronomical site, religion site<br>computer site, traffic site<br>areline site, weather site<br>sky site, pet dog site<br>movie site, baseball site<br>music site, rugby site<br>hospital site, soccer site<br>commu-nication site, fishing site<br>furniture site<br>furniture site, hockey site<br>present site, tennis site<br>science site, basketball site |

METHOD AND APPARATUS FOR DOMAIN HOSTING BY USING LOGO DOMAIN

TECHNICAL FIELD

The present invention relates to a logo domain hosting method and apparatus connecting directly to a domain address by using a logo.

BACKGROUND OF THE INVENTION

The present invention relates to logo domain hosting method and apparatus connecting directly to a domain address by using a logo.

The computer via Internet communicates in various networks of the whole world by using TCP/IP protocol.

All communication between hosts is based on a domain name system assigning 32 bits IP address like 203.252.113.61.

Because every web page has a distinct Internet uniform resource locator(URL), a web browser can receive an appointed web page without confusion.

Because every computer of the whole worldwide web is connected by Internet, if an address assignment rule is decided, a user can browse a desired web page and roughly guess a web page address.

All data used on the web have an address corresponding to a standard, such that the address is named uniform resource locator (URL). The URL is short for uniform resource locator and means a unified data address.

As web sites increase, web-hosting services, which open a free homepage commonly, occur. Homepage service enterprises secure a lot of members and display advertisements in each member's web site. Also, if a user visiting the homepage sees the advertisement, the homepage service enterprises can make a profit.

In the past, the user must know the correct address and then input the address in the address line in order to connect with an Internet site.

The Internet site connecting method of the past had a restriction on global services because of linguistic restrictions.

In the past, because the URL must be expressed by language, the Internet site connecting method was restricted to providing non-linguistic service globally.

There are instances in the past when the Internet site did not secure a lot of data displayed in the web browser.

In the past, it was difficult to input URL by using the input unit of the wireless mobile communications terminal.

Therefore, one object of the present invention is to provide a logo domain hosting method and apparatus for connecting with a desired site by selecting a logo that is directly understood.

Another object of the present invention is to provide a logo domain hosting method and apparatus for providing a global service regardless of language type, thereby not having any linguistic restriction.

Still another object of the present invention is to provide a logo domain hosting method and apparatus for displaying a large amount of data without the spatial restriction of an Internet site browser.

Still another object of the present invention is to provide a logo domain hosting method and apparatus for using a logo as a URL.

Still another object of the present invention is to provide a logo domain hosting method and apparatus for connecting a web site by selecting an obvious logo icon on the mobile communications terminal.

SUMMARY OF THE INVENTION

To accomplish the objects of the present invention according to one preferred embodiment of the present invention, a method is provided for receiving a domain request signal from a domain requester, wherein the domain request signal comprises a logo, registering the logo as a logo domain, and transmitting a logo domain registration confirmation signal corresponding to the registered logo domain, wherein if the Internet user selects the logo domain, then the browser corresponding to the Internet user transmits a classification code corresponding to the selected logo domain to a domain name server, the domain name server extracts an IP address corresponding to the classification code and transmits the IP address to the browser.

The logo domain providing method further comprises the steps of creating the classification code by using the domain request signal, wherein the domain request signal further comprises domain open information and the classification code is created by using the domain open information, connecting the classification code with the logo domain. The classification code comprises an identification number code and further comprises either an area classification code or a service classification code. Also, the classification code is assigned step by step.

The domain open information can comprise at least one of the area classification code and the service classification code. Also, the classification code is uniquely connected with the logo domain.

The classification code can further comprise a logo size classification code.

The logo size classification code sets up a logo size.

The logo domain providing method can further comprise the step of storing the registered logo domain. Also, the step of storing the registered logo domain is the step of storing the logo domain and the classification code.

The logo domain providing method further comprises the step of creating a logo icon corresponding to the logo domain, wherein the logo icon is provided to Internet users.

The logo icon is provided to the Internet users by using a plug-in. An upgraded logo icon can be provided to the Internet users by using the plug-in.

The logo icon can be displayed by using the user's private browser.

The logo icon can be displayed as wallpaper of an operating system.

The logo icon can comprise at least identification and password of the site. When the user clicks the logo icon, the user can log into the site automatically.

The logo is an image.

The image is either a two dimensional image or a three dimensional image.

The domain request signal can comprise the logo provided by the domain requester. Otherwise the domain request signal can comprise the logo selected by the domain requester in the provided plural logo.

To select the logo domain a user clicks a logo icon corresponding to the logo domain.

The logo icon can be distributed widely to the Internet users in the Internet site.

The updated logo icon can be provided to the Internet users in the Internet site.

To accomplish the objects of the present invention, and according to another preferred embodiment of the present invention, a logo domain browsing method is provided for providing at least one logo icon to a Internet user (the logo icon corresponds to a logo domain and is connected to a classification code), extracting a classification code corresponding to the logo icon selected by the Internet user, transmitting the extracted classification code to a domain name server, receiving an IP address corresponding to the classification code from the domain name server, and connecting to the Internet site corresponding to the IP address.

The logo domain browsing method further comprises the steps of providing an updated logo icon for the Internet user. The updated logo icon is stored at storage.

A "favorites" service is provided to the Internet user. Also, the Internet user can add the logo icon to the favorites list.

The domain name server extracts the IP address corresponding to the received classification code.

The logo domain browsing method can be executed on wired network or wireless network.

To accomplish the objects of the present invention according to another preferred embodiment of the present invention, a logo domain providing method is provided for receiving a domain request signal from a domain requester (the domain request signal comprises a logo), registering the logo as logo domain (the logo domain is connected with one classification code and the classification code is connected with an IP address), receiving a classification code corresponding to the logo domain from the browser of an Internet user (when the Internet user selects the logo domain, the browser extracts the classification code corresponding to the logo domain), extracting an IP address corresponding to the classification code, and transmitting the IP address to the browser, wherein the browser provides an Internet site corresponding to the IP address for the Internet user by using the IP address.

To accomplish the objects of the present invention according to another preferred embodiment of the present invention, a logo domain providing method is provided for receiving a domain request signal from a domain requester (the domain request signal comprises a logo), registering the logo as logo domain (the logo domain is connected with an IP address), receiving an IP address corresponding to the logo domain from the browser of an Internet user, transmitting the IP address to the browser, wherein the browser provides an Internet site corresponding to the IP address for the Internet user by using the IP address.

The logo domain providing method can connect the logo domain with the IP address by using the domain request signal. The domain request signal can further comprise domain open information.

The logo domain providing method can further comprise the step of storing the registered logo domain. Also, the step of storing the registered logo domain is the step of storing the logo domain and the IP address.

To accomplish the objects of the present invention according to another preferred embodiment of the present invention, a logo domain providing method is provided for receiving a domain request signal from a domain requester (the domain request signal comprises a logo), registering the logo as logo domain, transmitting a registration confirmation signal corresponding to the registered logo domain, wherein if an Internet user selects the logo domain, then the browser corresponding to the Internet user converts the classification code corresponding to the selected logo into a uniform resource locator(URL) and transmits the URL to a domain name server and the domain name server extracts an IP address corresponding to the URL and transmits the IP address to the browser.

The browser can comprise a logo domain analysis utility.

The logo domain analysis utility converts the classification code into the URL.

According to another exemplary embodiment of the present invention, a recorded medium is provided for tangibly embodying a program of instructions executable by a digital processing apparatus to execute a logo domain browsing method. The recorded medium is readable by the digital processing apparatus. The program comprises: providing at least one logo icon to an Internet user, such that the logo icon corresponds to a logo domain and is connected to a classification code; allowing the internet user to select a logo icon; extracting a classification code corresponding to the selected logo icon by the Internet user; transmitting the extracted classification code to a domain name server; receiving an IP address corresponding to the classification code from the domain name server; and connecting to the Internet site corresponding to the IP address.

BRIEF DESCRIPTIONS OF THE DRAWINGS

The above objects and other advantages of the present invention will become more apparent by detailed descriptions of the preferred embodiments thereof with reference to the attached drawings, in which.

FIG. 10a through FIG. 10c comprise a schematic diagram illustrating the construction of the classification code number corresponding to a logo in the present invention.

Figure 11A:
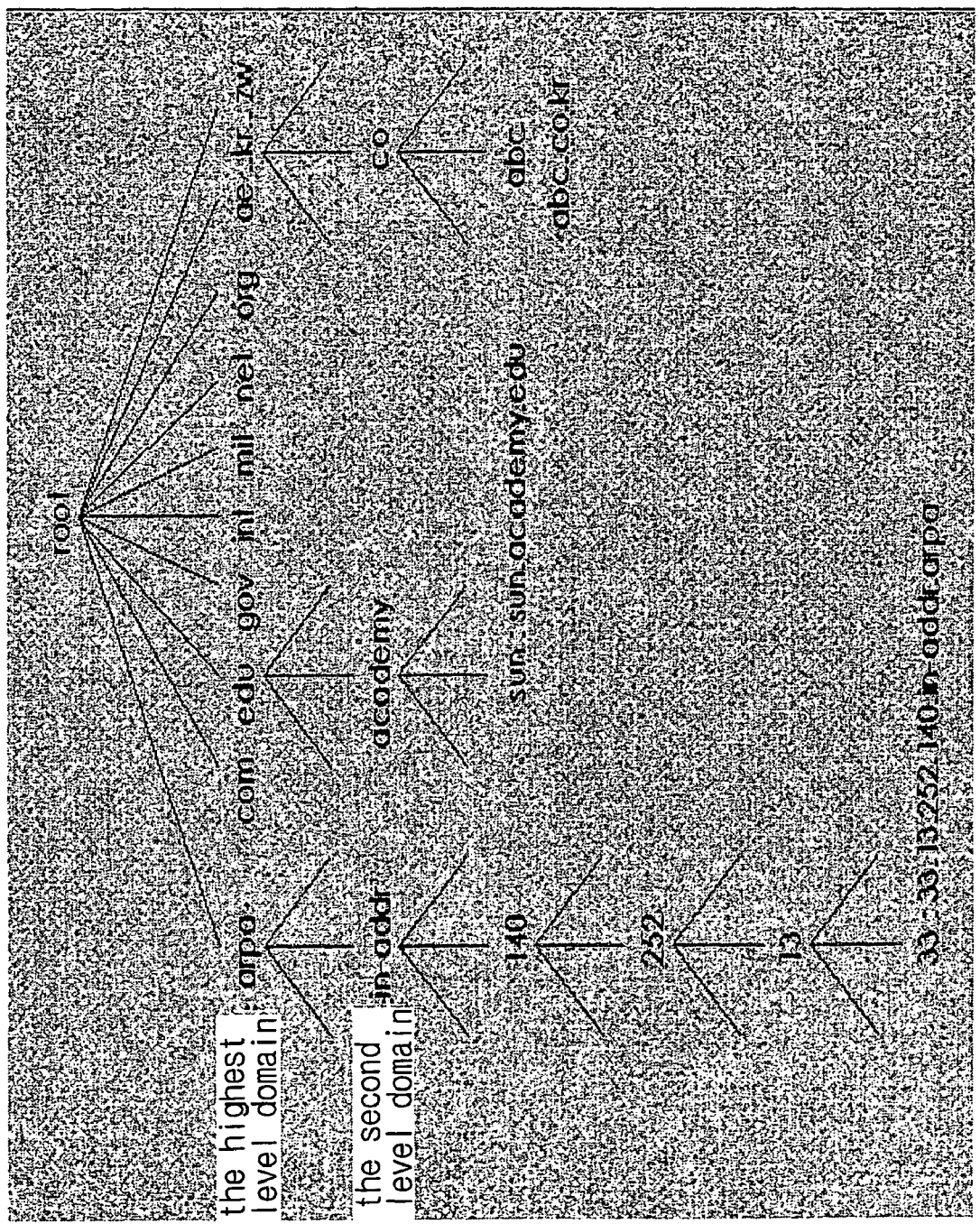

FIG. 11A and FIG. 11B is a schematic diagram illustrating the construction of a domain name server in the past.

Figure 12:
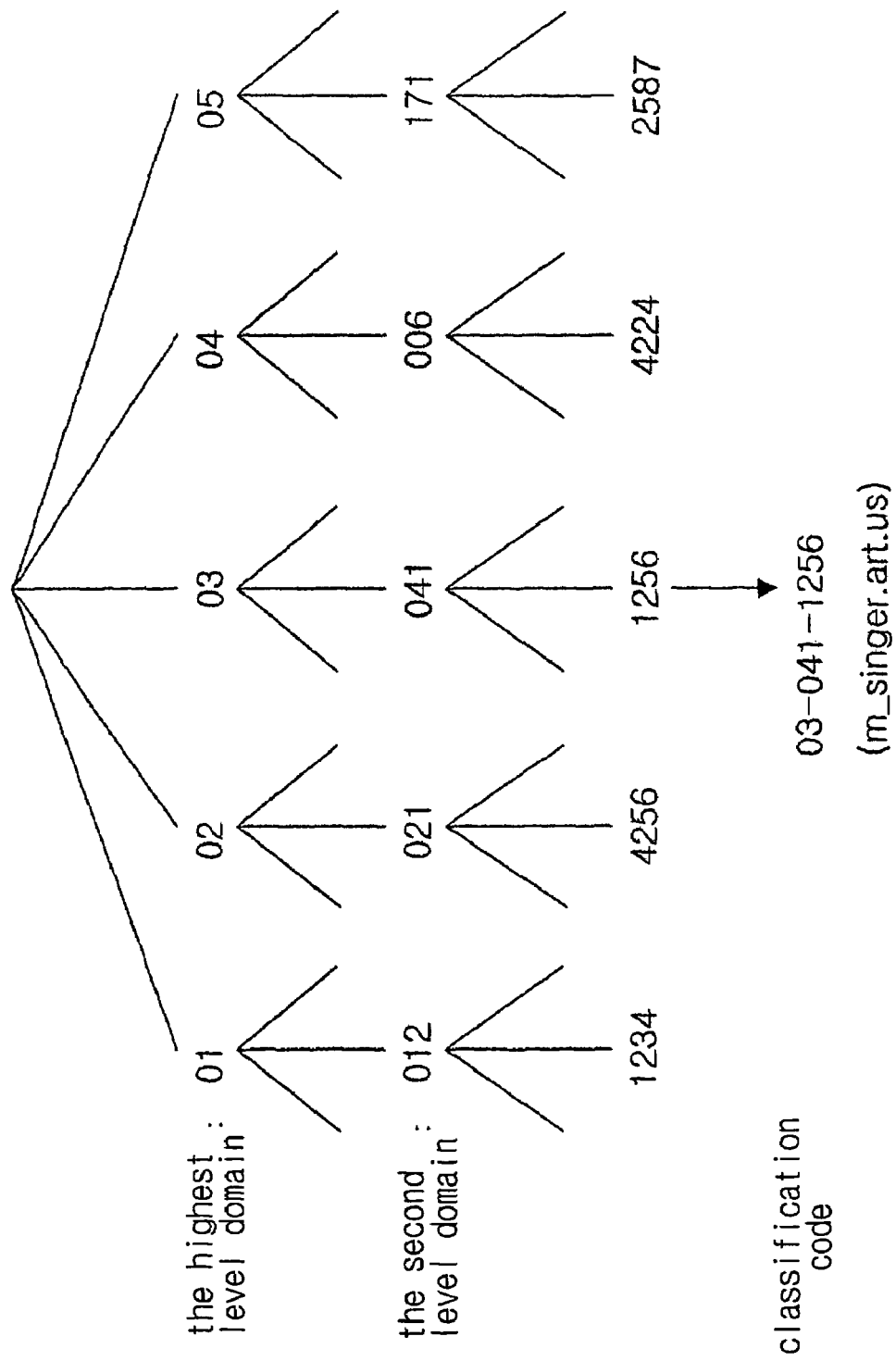

FIG. 12 is a schematic diagram illustrating the construction of a domain name server in the present invention.

Figure 13:
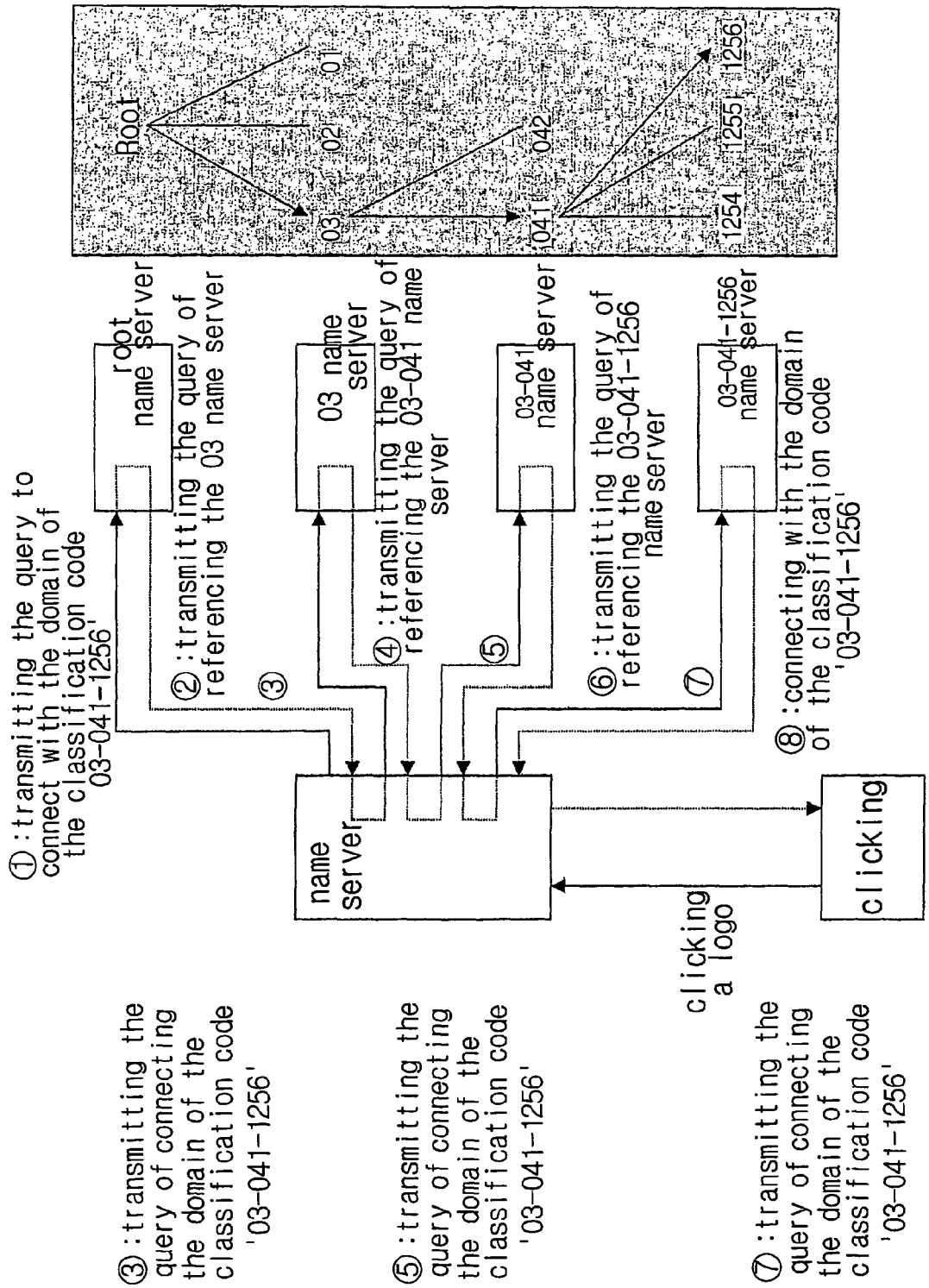

FIG. 13 is a flowchart illustrating the process of moving data in the domain name server in the present invention.

FIG. 14 is a screen example illustrating a plug-in browser in the present invention.

Figure 15:
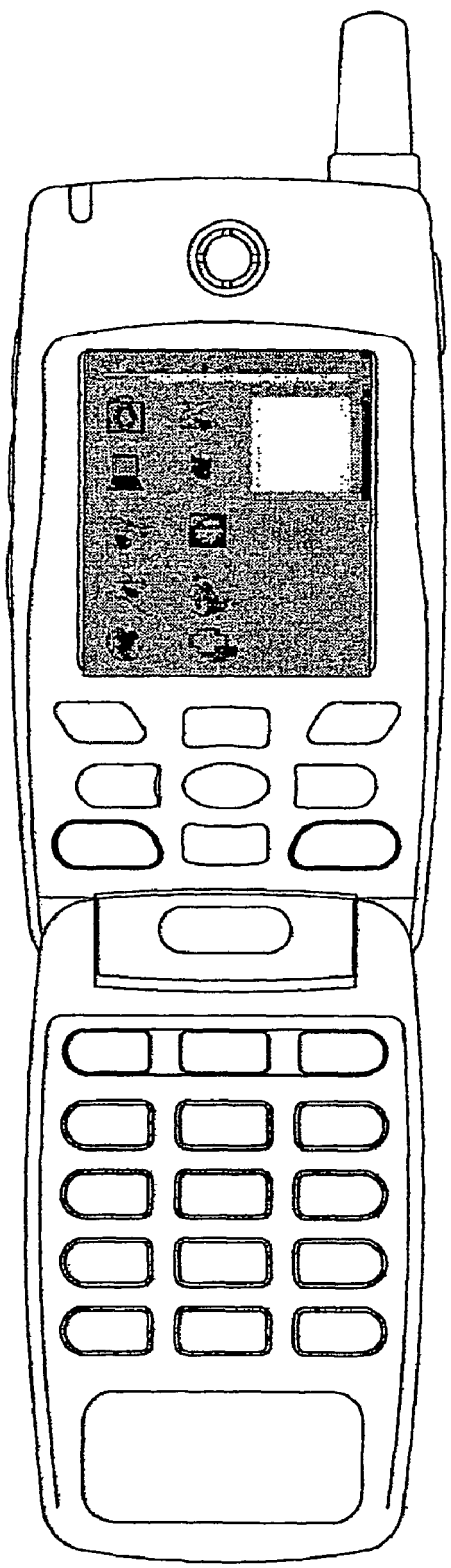

FIG. 15 is a screen example illustrating a plug-in browser of a mobile phone in the present invention.

A KEY TO NUMERICAL REFERENCES TO THE MAJOR PARTS OF THE DRAWINGS

105 . . . logo domain server
107 . . . domain name server
201 . . . hosting integration database
202 . . . DBMS(database management system)
203 . . . client authentication part
205 . . . domain assignment module
207 . . . plug-in constructing engine
209 . . . server control part
301 . . . memory management part
303 . . . domain assignment part
305 . . . settlement processing part
401 . . . classification code creating part
403 . . . logo icon creating part
405 . . . processing part
407 . . . input/output part
501 . . . settlement part
503 . . . encryption/decryption part
505 . . . input/output part
601 . . . classification code selecting part
603 . . . plug-in integration database
605 . . . plug-in operating part
607 . . . input/output part
701 . . . logo icon database
703 . . . classification code database
705 . . . client database
707 . . . plug-in database

EMBODIMENT

Hereinafter, preferred embodiments of the present invention will be described in more detail with reference to the accompanying drawings, but it is understood that the present invention should not be limited to the following embodiments.

The present invention relates to a system and method for providing logo domain hosting to an Internet user.

The present invention relates to a logo domain hosting method and apparatus connecting directly to a domain address by using a logo.

The Internet user can be provided the domain as a logo. Also, if the Internet user selects the logo directly, then he will connect to the site corresponding to the logo. The logo is analyzed into figures, pictures and images in order to remind people of company names, organization names, objects and phenomena, services and so on.

Also, the logo can use either a two dimensional image or a three dimensional image.

Figure 1:
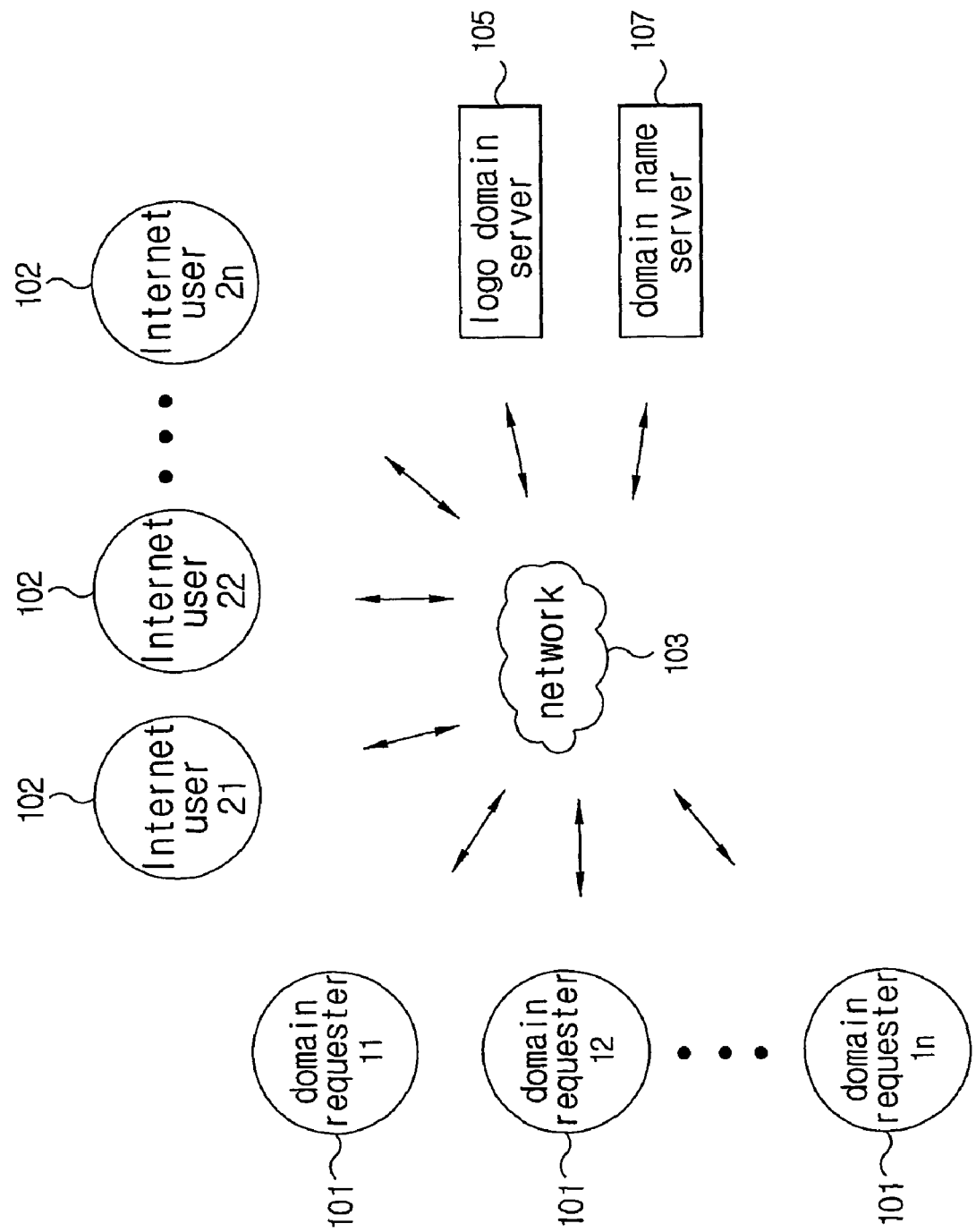
FIG. 1 is a schematic diagram of the logo domain server in the present invention.

FIG. 1 is a schematic diagram of the logo domain server in the present invention.

Referring to FIG. 1, the logo domain server 105 connects with the domain name server 107, plural domain requester 101, and plural Internet user 102 through communication network 103. The communication network 103 comprises wired communication network and wireless communication network.

The domain requester 101 indicates that the Internet user wants a web hosting service. When the domain requester 101 connects with the logo domain server 105 through the communication network, the logo domain server 105 assigns a desired domain to the domain requester 101. The Internet user 102 indicates that an Internet user wants some information. The Internet user 102 can search information by using a service that is provided by the logo domain server 105 through the communication network 103.

The domain name server 107 is composed of a level construction different from a past domain name server. The domain name server 107 can be comprised in the logo domain server 105 as a domain name system. The domain name server 107 will be described; in more detail with reference to the accompanying drawings later. The domain requester 101 can be provided with its own domain existing uniquely in the whole world by using the logo domain server 105 in the present invention. Also, the domain requester 101 can be provided a desired logo as a domain address in itself.

For example, when the domain requester 101 wants to be provided a web hosting service in order to open a movie site, the domain requester 101 can use a desired movie logo as a domain address by registering the movie logo at the logo domain server 105. The domain opening method will be described in more detail with reference to accompanying drawings later.

If the Internet user 102 does not have any information on a site address URL, then the user 102 can be directly connected with the desired site by using a logo domain address and provided with information.

For example, when the Internet user 102 wants to get information about science and cannot search a science site URL, the Internet user 102 can connect with a science site and receive information by clicking a microscope logo directly.

Figure 2:
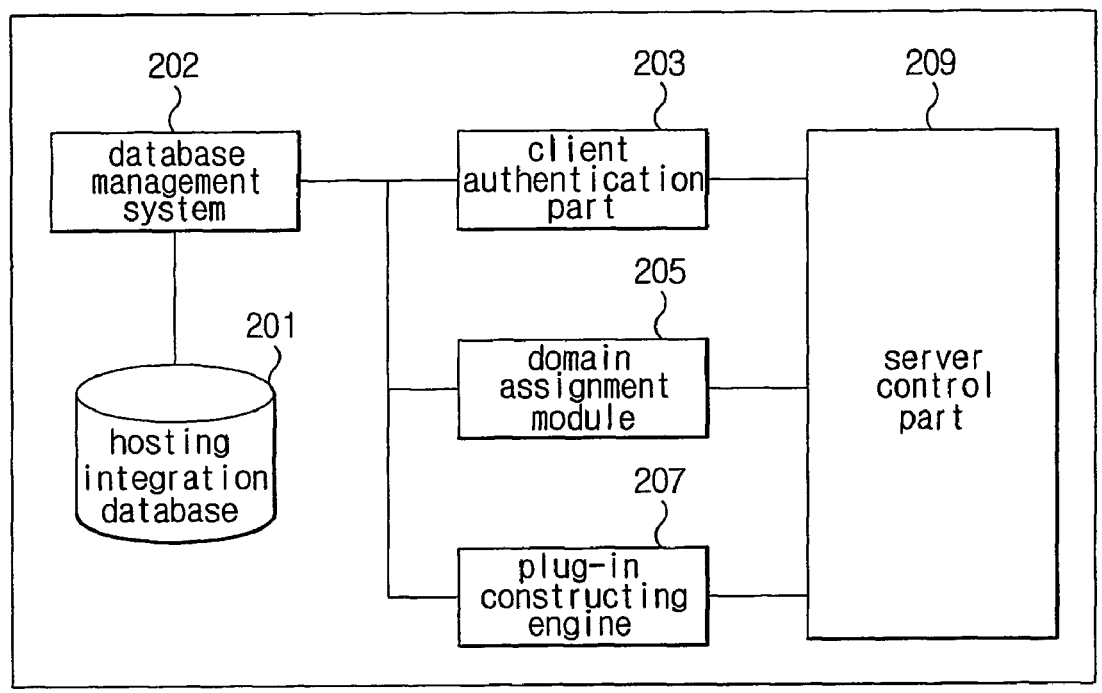
FIG. 2 is a schematic constructional diagram of the composition of the logo domain server in the present invention.

FIG. 2 is a schematic constructional diagram of the composition of the logo domain server in the present invention.

Referring to FIG. 2, the logo domain server 105 comprises a hosting integration database 201, a database management system 202, a client authentication part 203, a domain assignment module 205, a plug-in constructing engine 207 and a server control part 209.

The hosting integration database 201 stores logo icon information, classification code information, domain requester information, and plug-in information. The logo icon is an icon created by connecting a logo with a classification code.

The database management system 202 manages data of the hosting integration database 201. Because the function of the database management system 202 is based on general knowledge, we will omit the concrete explanation of it.

The hosting integration database 201 will be described in more detail with reference to FIG. 7.

If the client authentication part 203 receives information of the domain request 101 from the server control part 209, then the domain request 101 is authenticated. For example, the client authentication part 203 receives information such as identification, a password and a resident registration number of the domain request 101 from the server control part 209. Then the client authentication part 203 authenticates the domain requester 101 and the Internet user 102 by using data stored in the hosting integration database 201.

The domain assignment module 205 receives a domain request signal from the domain requester 101 and opens a domain corresponding to the domain requester 101 and settles an account to open the domain. The domain request signal comprises domain open information like memory information, domain requester information, open domain features, settlement information and using logo. Also, the domain assignment module 205 couples the open domain with the logo icon selected by the domain requester 101. The function of the domain assignment module 205 will be described in more detail with reference to FIG. 3.

The plug-in constructing engine 207 creates a plug-in in the logo domain server 105 by using data of the hosting integration database 201. The plug-in provides plural logo icons updated by the logo domain server 105 with the domain requester 101 and the Internet user 102. The domain requester 101 and the Internet user 102 can be provided the updated logo icon through an Internet site. For example, the domain requester 101, the Internet user 102 and the logo domain server 105 can distribute the updated logo icon to their Internet site and other Internet sites in order to share the updated logo icon. Also, the plug-in performs a utility function like data management or remote control. The inner construction of the plug-in constructed by the plug-in constructing engine 207 will be described in more detail with reference to FIG. 6.

The server control part 209 controls the logo domain server 105 on the whole. To be more concrete, the server control part 209 transmits data and signals to the domain requester 101 and the Internet user 102 and receives data and signals from the domain requester 101 and the Internet user 102. And the server control part 209 controls connections among all sessions in the logo domain server 105. The transmitting data of the server control part 209 can comprise the updated logo icon.

Figure 3:
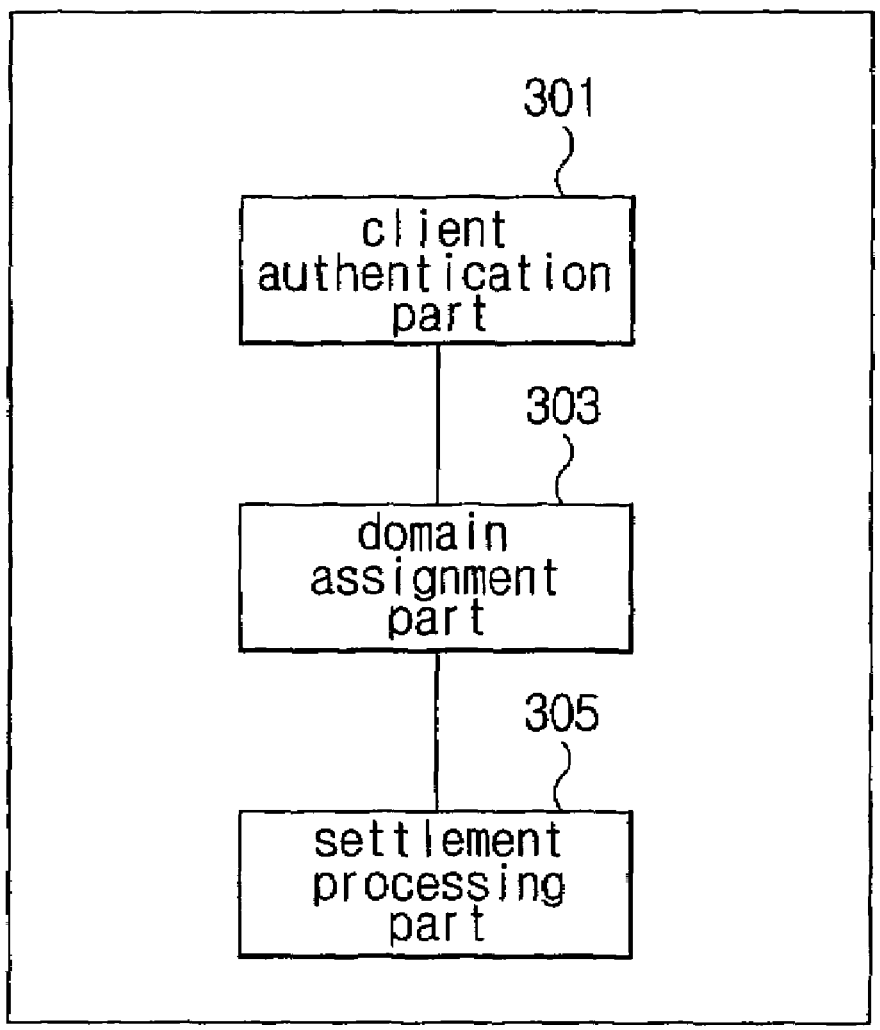
FIG. 3 is a schematic constructional diagram of a domain assignment module in the present invention.

FIG. 3 is a schematic constructional diagram of a domain assignment module in the present invention.

Referring to FIG. 3, the domain assignment module 205 comprises a memory management part 301, a domain assignment part 303, and settlement processing part 305. The domain assignment module 205 opens a domain to the domain requester 101 in response to the domain request signal of the domain requester 101.

If the memory management part 301 receives the domain request signal from the domain requester 101, thereafter the memory management part 301 confirms whether it recognizes the settlement or not and assigns a domain memory corresponding to the request of the domain requester 101.

After the memory management part 301 confirms whether it recognizes the settlement or not, the domain assignment part 303 creates a classification code and a logo icon for opening a domain. And the memory management part 301 opens a domain corresponding to the domain requester 101 to the extent of memories assigned by the memory management part 301.

The domain assignment part 303 will be described in more detail with reference to FIG. 4.

The settlement processing part 305 processes the settlement corresponding to the domain requester 101, and transmits a settlement authentication result to the domain assignment part 303 and the memory management part 301.

The settlement processing part 305 will be described in more detail with reference to FIG. 5.

Figure 4:
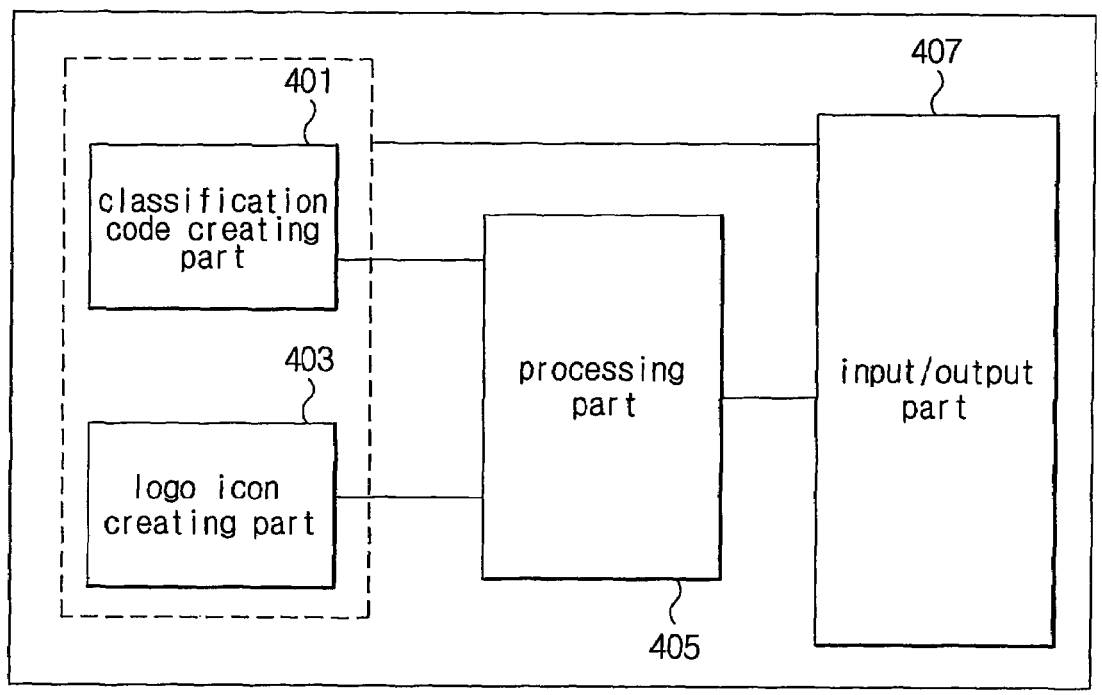
FIG. 4 is a schematic diagram illustrating the concrete construction of a domain assignment part in the present invention.

FIG. 4 is a schematic diagram illustrating the concrete construction of a domain assignment part in the present invention.

Referring to FIG. 4, the domain assignment part 303 comprises a classification code creating part 401, a logo icon creating part 403, a processing part 405, and an input/output part 407.

The input/output part 407 receives the domain request signal and the selected logo file from the domain requester 101, and transmits them to the classification code creating part 401 and the logo icon creating part 403. The logo file selected by the domain requester 101 can be a logo file provided by the domain server 105.

The classification code creating part 401 creates a classification code according to the request condition of the domain request signal, and transmits the classification code to the processing part 405.

The logo icon creating part 403 creates a logo icon by using the logo file selected by the domain requester 101, and transmits the logo icon to the processing part 405.

The logo icon can be displayed as "wallpaper" of an operating system used by the domain requester 101 or the Internet user 102. That is, the logo icon can be displayed as wallpaper of a personal computer used by the domain requester 101 or the Internet user 102.

Also, the Internet user 102 stores private information about the logo icon. And if the Internet user 102 clicks the logo icon, then the Internet user 102 connects with the site and logs into the site automatically by using the private information.

The private information comprises the identification and the password to log into the site corresponding to the logo icon. The log in method by using the logo icon must accompany the cryptography.

The Internet user 102 can search information by using the logo icon directly. Also, the Internet user 102 can search from a higher concept logo icon to a lower concept logo icon. The Internet user 102 can search by using the text input function included in the logo icon.

For example, the Internet user 102 wants to search a soccer player Hong Myoung-Bo. If the Internet user 102 clicks an exercise logo icon, then lower concept logo icons corresponding to the exercise logo icon are displayed. If the Internet user 102 selects a soccer logo icon of the lower concept logo icons and clicks the right button of a mouse, a text input window is displayed. If the Internet user 102 inputs 'Hong Myoung-Bo' in the text input window and requests a search, then the search result is displayed.

The processing part 405 couples the created classification code with the logo icon, and stores them in the hosting integration database 201 through the input/output part 407.

As described above, the domain assignment part 303 confirms the settlement authentication result of the domain requester 101 and creates the classification code and the logo icon for opening the domain. Also, the domain assignment part 303 opens the domain by using the memory assigned by the memory management part 301.

Figure 5:
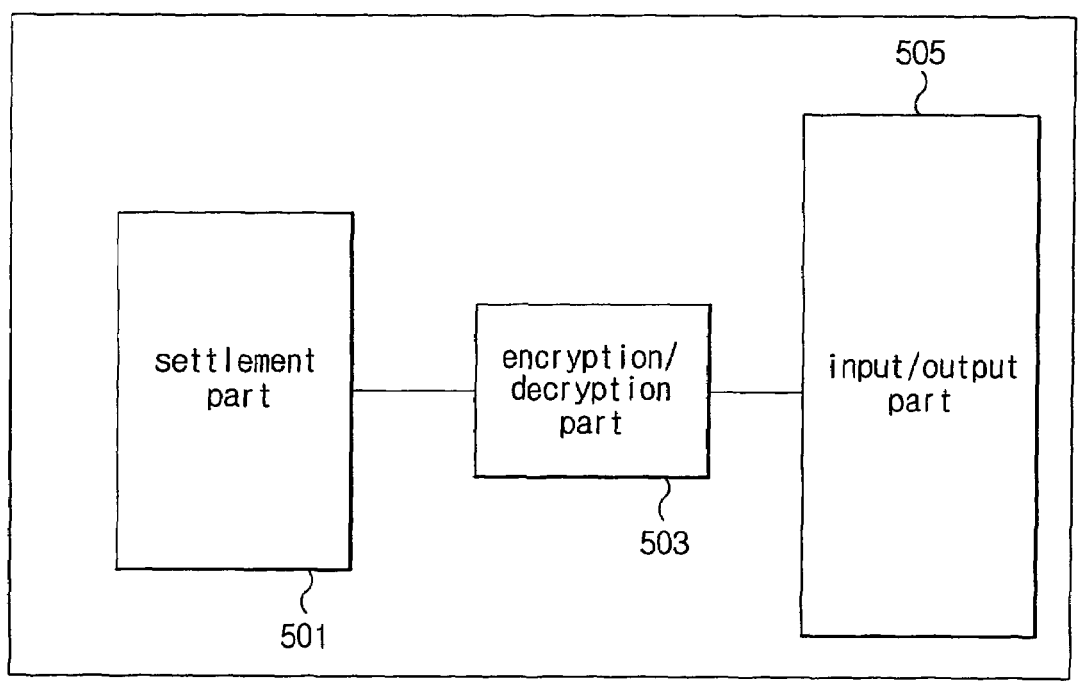
FIG. 5 is a schematic diagram illustrating the concrete construction of a settlement processing part in the present invention.

FIG. 5 is a schematic diagram illustrating the concrete construction of a settlement processing part in the present invention.

Referring to FIG. 5, the settlement processing part 305 comprises a settlement part 501, an encryption/decryption part 503, and an input/output part 505.

If the domain requester 101 requests to open a domain through the communication network 103, then the input/output part 505 receives the necessary information and provides it the encryption/decryption part 503. The necessary information comprises a resident registration number, a bankbook account number, and a card number related to settlement.

The encryption/decryption part 503 encrypts or decrypts the necessary information and transmits it to the settlement part 501.

The settlement part 501 requests that an outside settlement organization should confirm the settlement through the input/output part 505. If the input/output part 505 receives a settlement authentication result from the outside settlement organization, the settlement part 501 transmits the settlement authentication result to the memory management part 301 and the domain assignment part 303. The memory management part 301 and the domain assignment part 303 open the domain by using the necessary information.

Figure 6:
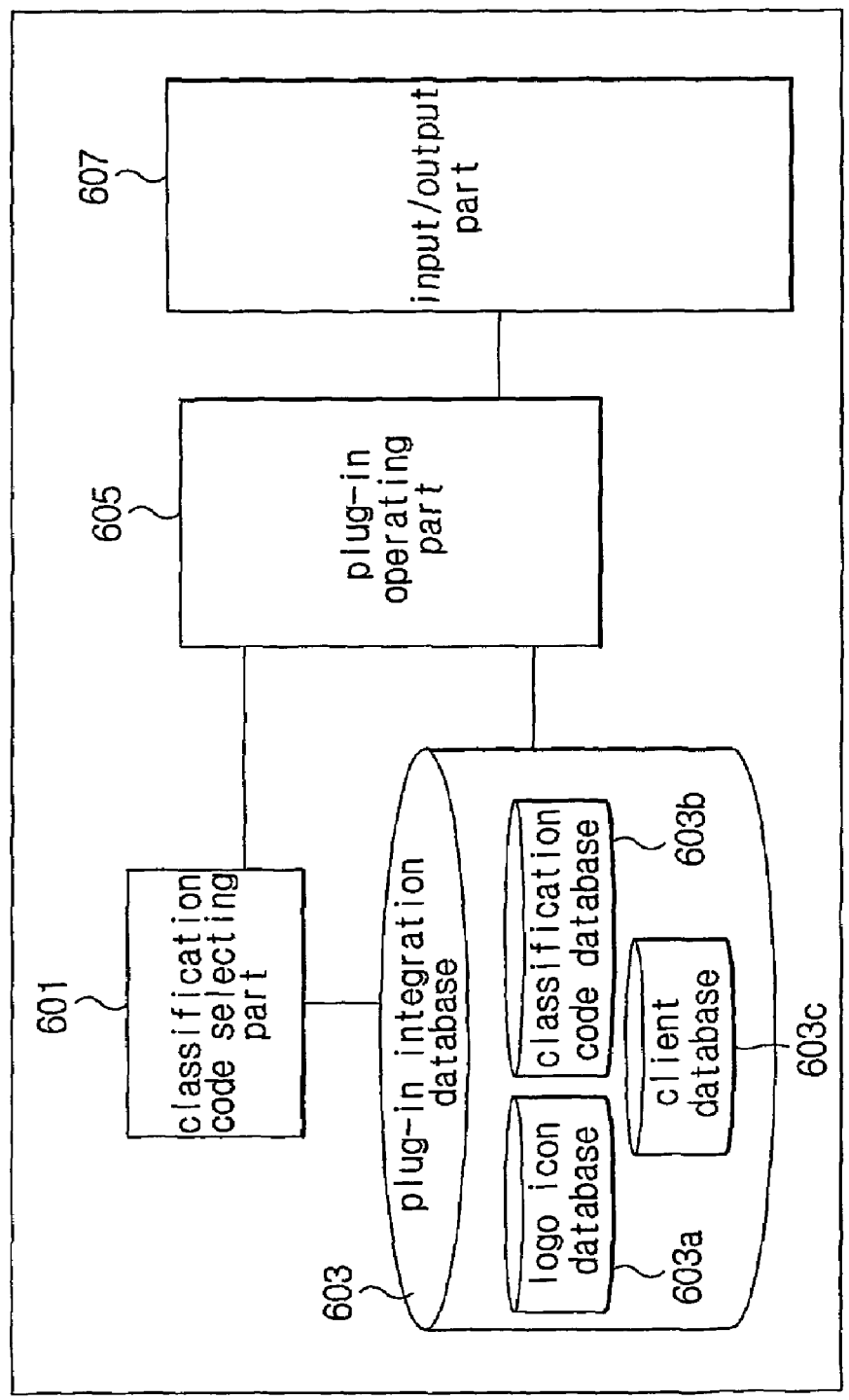
FIG. 6 is a schematic diagram illustrating the inner construction of the plug-in constructed by the plug-in building engine in the present invention.

FIG. 6 is a schematic diagram illustrating the inner construction of the plug-in constructed by the plug-in building engine in the present invention.

Referring to FIG. 6, the plug-in 600 comprises a classification code selecting part 601, a plug-in integration database 603, a plug-in operating part 605, and an input/output part

607. The plug-in integration database 603 comprises a logo icon database 603*a*, a classification code database 603*b*, and a client database 603*c*.

The classification code selecting part 601 extracts the classification code corresponding to the logo icon selected by the Internet user 102.

The logo icon database 603*a* stores plural logo icons coupled with the classification code.

The classification code database 603*b* stores plural classification code coupled with the logo icon.

The client database 603*c* stores information on the Internet user 102. Also, the client database 603*c* stores the logo icon coupled with the classification code added to the favorites list by the Internet user. Each database relates to the other database.

The plug-in operating part 605 transmits the classification code selected in the classification code selecting part 601 to the domain name server 107 through the input/output part 607. Also, the plug-in operating part 605 receives the updated logo icon and the classification code from the logo domain server 105 through the input/output part 607. Also, the plug-in operating part 605 stores the updated logo icon and the classification code at the plug-in integration database 603.

The plug-in can accomplish the function of a logo domain analysis utility. The logo domain analysis utility converts the classification code to a uniform resource locator (URL).

The plug-in transmits the converted URL to a former domain name server and receives an IP address corresponding to the URL from the former domain name server.

Figure 7:
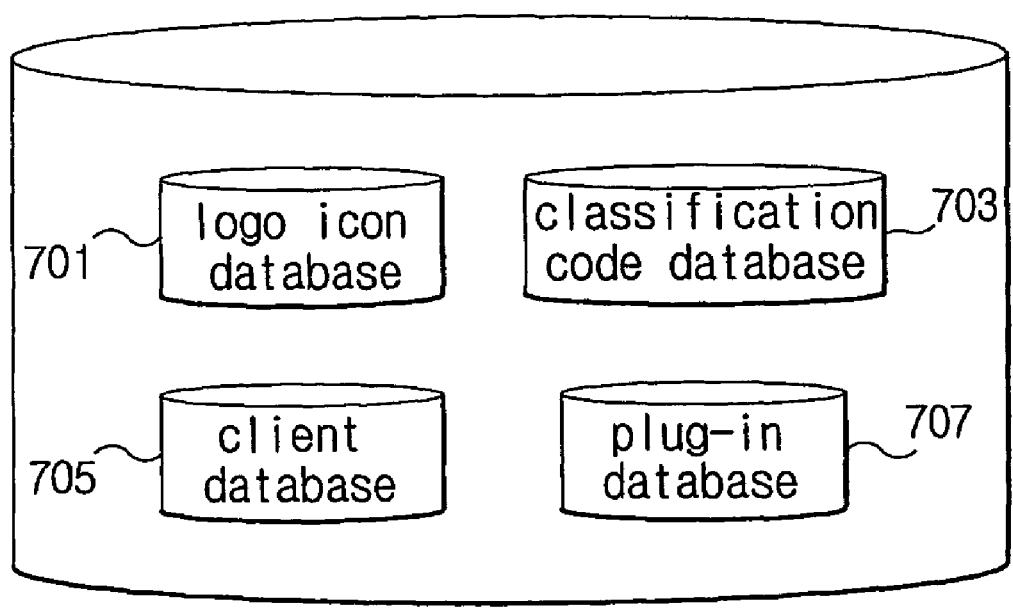
FIG. 7 is a schematic diagram illustrating the construction of the hosting integration database in the present invention.

FIG. 7 is a schematic diagram illustrating the construction of the hosting integration database in the present invention.

Referring to FIG. 7, the hosting integration database 201 comprises a logo icon database 701, a classification code database 703, a client database 705, and a plug-in database 707.

The logo icon database 701 stores plural logo icons coupled with the classification code.

The classification code database 703 stores plural classification codes coupled with the logo icon.

The client database 705 stores information of the domain requester 101.

The plug-in database 707 stores information for constructing the plug-in. Each database relates to the other database.

Figure 8:
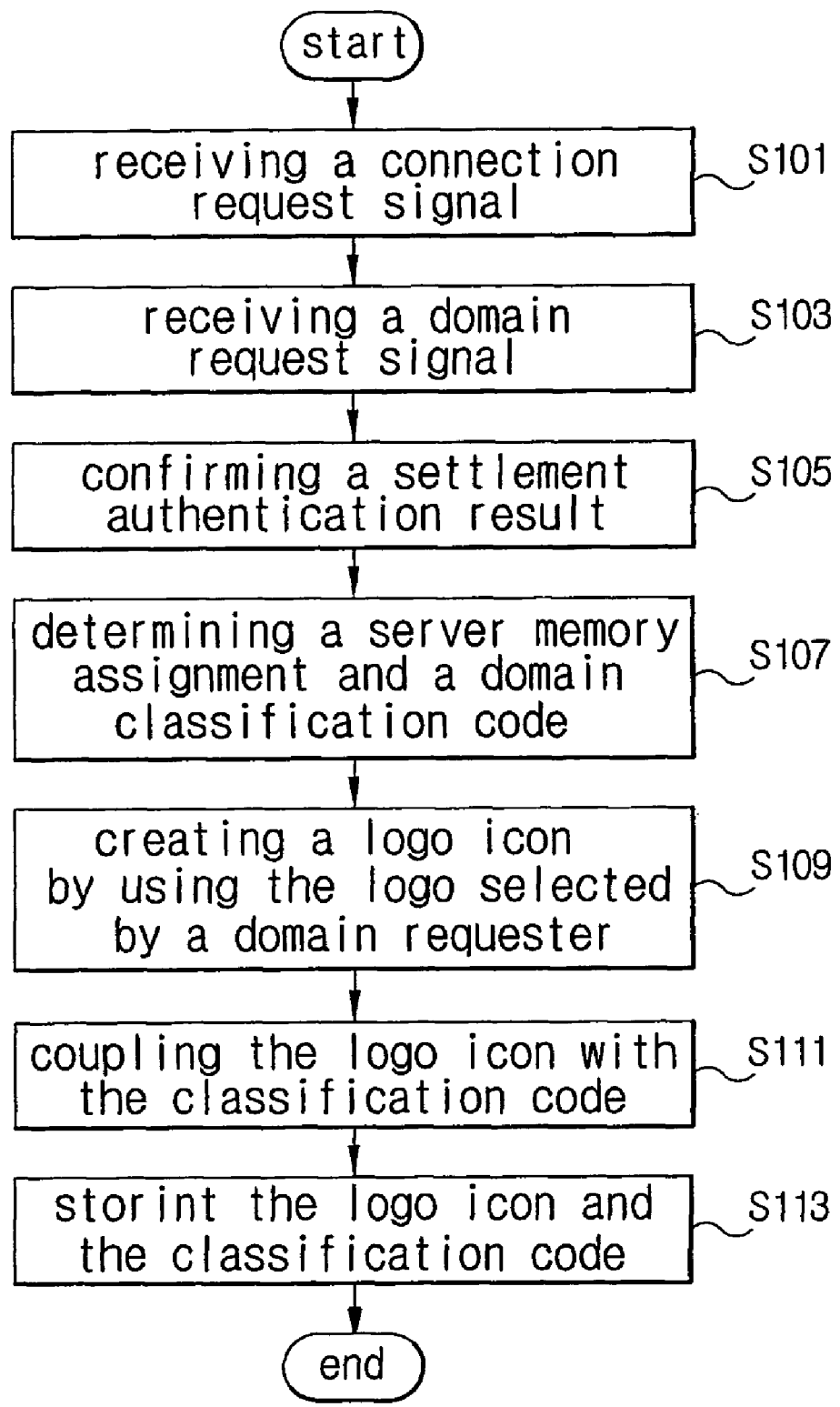
FIG. 8 is a flowchart illustrating the process of assigning a domain to the domain user connected to a server in the present invention.

FIG. 8 is a flowchart illustrating the process of assigning a domain to the domain user connected a server in the present invention.

Referring to FIG. 8, the logo domain server 105 receives a connection request signal from the domain requester 101 through the communication network 103(S101). The logo domain server 105 transmits the web page to the domain requester 101 in response to the connection request signal and receives the domain request signal from the domain requester 101(S103). The domain request signal can comprise information like memory information, domain requester information, open domain features, settlement information and using logo.

The logo domain server 105 confirms the settlement authentication result of the domain requester 101(S105). The settlement authentication result is the result confirmed by the outside settlement organization.

After confirming the settlement authentication result, the logo domain server 105 determines a server memory assignment and a domain classification code corresponding to the selection of the domain requester 101(S107). The selection of the domain requester 101 can comprise a domain memory, a logo image, a domain feature, and private information of the domain requester 101.

After determining the server memory assignment and the domain classification code, the logo domain server 105 creates a logo icon by using the logo selected by the domain requester 101(S109). The logo icon is an icon created to couple the logo with the classification code.

After creating the logo icon, the logo domain server 105 couples the logo icon with the classification code(S111).

After coupling the created logo icon with the determined classification code, the logo domain server 105 stores the logo icon and the classification code at the hosting integration database 201(S113).

Figure 9:
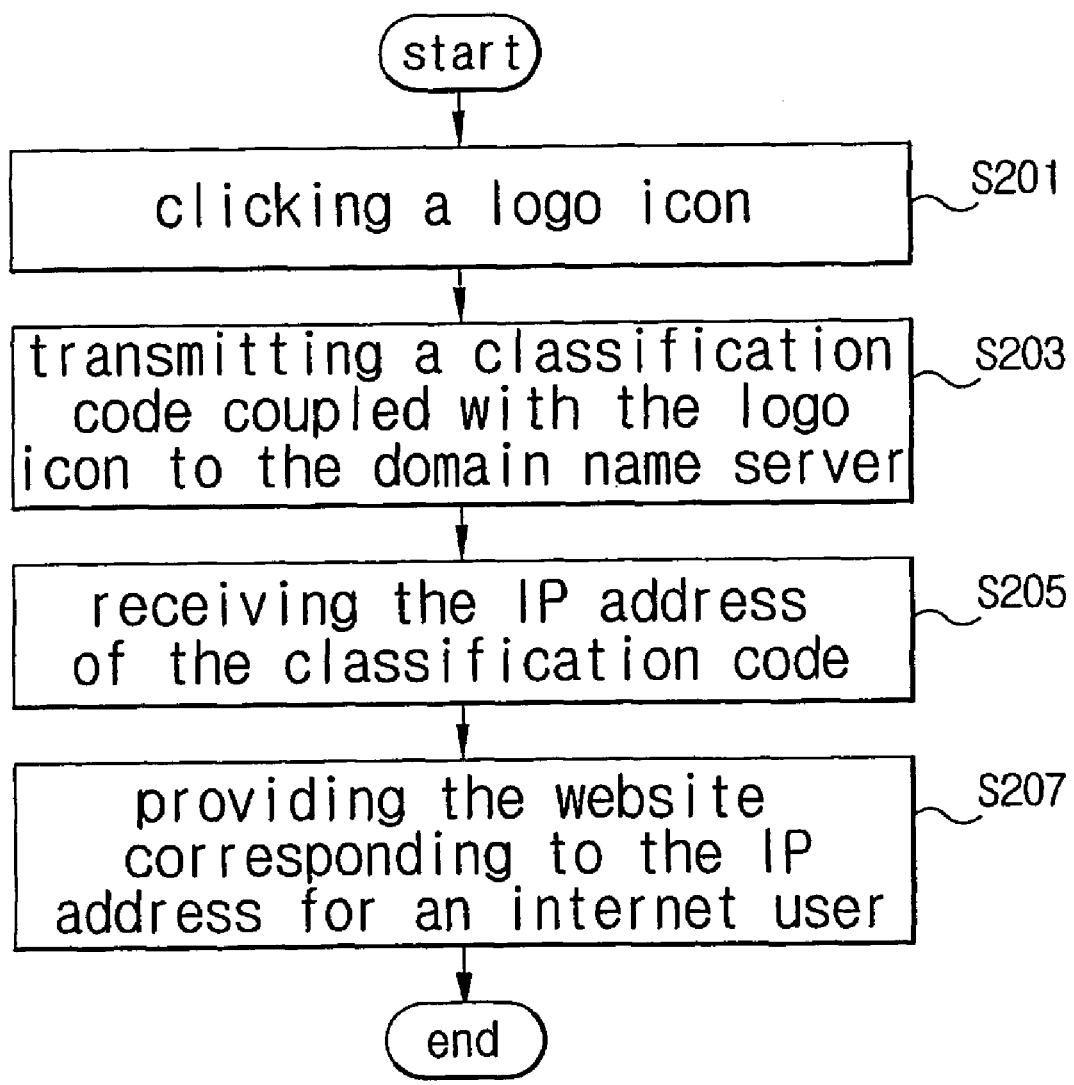
FIG. 9 is a flowchart illustrating the process of providing an Internet user with a website corresponding to the selected logo icon in the present invention.

FIG. 9 is a flowchart illustrating the process of providing an Internet user with a website corresponding to the selected logo icon in the present invention.

Referring to FIG. 9, the Internet user 102 clicks the logo icon coupled with the classification code(S201). The Internet user 102 is holding the plug-in provided by the logo domain server 105.

The Internet user 102 transmits the classification code coupled with the logo icon to the domain name server 107 through the communication network 103(S203).

The Internet user 102 receives the IP address of the classification code mapped by the domain name server 107(S205). And the domain name server 107 provides the website corresponding to the IP address with the Internet user 102(S207).

If the domain name server 107 is comprised within the logo domain server 105 as domain name system, then the Internet user can transmit the classification code coupled with the logo icon to the logo domain server 107.

Also, the logo domain server 105 couples the logo icon with the IP address in the logo domain server 105 and provides the Internet site corresponding to the IP address with the Internet user 102.

Because the other embodiments are the same as described above, the similar concrete explanation will be omitted.

FIG. 10*a* and FIG. 10*c* comprise a schematic diagram illustrating the construction of the classification code number corresponding to a logo in the present invention.

Referring to FIG. 10*a* and FIG. 10*c,* the first two or three characters of the classification code indicate an area classification code. The area classification code can indicate continents or countries like all the countries of the world, Europe, Asia, Korea, the United States of America and England. Also, the area classification code can indicate detailed areas like Seoul, Beijing, Washington, Tokyo and so on.

The second one or five characters of the classification code indicate the service classification code. The service classification code can indicate services like medical science, education, art, science and government.

The third four or seven characters of the classification code indicate a proper number of a domain. One domain has only one classification code. The classification code is composed of numbers generally. Or the classification code can be the secondary mark composed of meaning characters corresponding to the classification code.

The classification code is composed of the hierarchical structure comprising the area classification code, the service classification code, and the proper number. For example, if the Internet user 102 wants to connect with the American singer Madonna's site to use a search function, then the Internet user 102 clicks the logo icon comprising Madonna's facial picture. The Madonna logo icon is composed of the area classification code of the United States '03' 801, the service classification code of art '041' 803, and the proper number for Madonna '1256' 805.

As another example, if the Internet user 102 wants to connect with the Kang-Nan hospital site of Korea to use a search function, then the Internet user 102 clicks the logo icon of the Kang-Nam hospital. The Kang-Nam hospital logo icon is composed of the area classification code of Korea '01' 807, the service classification code of medical science '012' 809, and the proper number for Kang-Nam hospital '1234' 811. The logo image corresponding to the site's characters must be selected.

The Internet user 102 clicks the Korea logo icon of plural area classification code in order to connect to the Kang-Nam hospital site of Korea. The Korea logo icon can be properly indicated by the Korean flag because it is suitable for representing Korea.

When the Internet user 102 clicks the Korean logo icon, plural service classification codes corresponding to the Korean logo icon are provided through the browser. The Internet user 102 can click the medical science logo icon of the plural service classification codes. When the Internet user 102 clicks the medical science logo icon, plural hospital logo icons and medical science icons are provided through the browser. If the Internet user 102 clicks the Kang-Nam hospital logo icon within the plural hospital logo icons, then the Internet user 102 can connect to the Kang-Nam hospital site. The domain name server 107 receives the classification code '01-012-1234' and provides the IP address corresponding to the Kang-Nam hospital site with the Internet user 102. The mapping method of the classification code will be described in more detail with reference to FIG. 13 and FIG. 14.

The classification code can comprise a logo size classification code. The logo size classification code is the classification code to decide the logo size.

For example, the logo size can be a standard type, an extended type, and a reduced type. The standard type is used for the general web browser, the reduced type is used for the mobile communication terminal, and the extended type is used when a company logo is used for advertisement effects.

The browser can be the plug-in browser created by the plug-in constructing engine 207.

Also, the browser can be the logo browser accomplishing the function of the logo domain server 105. For example, the domain requester 101 having the server can be serviced by the logo domain hosting by using the logo browser. A registration organization registers the logo not to double registered logos.

The higher concept logo should be properly excluded when the logo is provided with the domain requester 101.

FIG. 11A and FIG. 11B is a schematic diagram illustrating the construction of a domain name server in the past.

Referring to FIG. 11A and FIG. 11B, the hierarchical structure of the former domain name server comprises some higher domain nodes and two level lower domain nodes corresponding to the higher domain node. Also, the domain name of the tree structure is composed of label lists like 'abc.co.kr'. Also, the domain name starts from the node and goes up from the node, and the labels are distinguished by a point. Each node of the tree structure has a peculiar domain name.

FIG. 12 is a schematic diagram illustrating the construction of a domain name server in the present invention.

Referring to FIG. 12, the hierarchical structure of the domain name server 107 comprises plural higher domain nodes in the root and comprises two level lower domain service classification code nodes corresponding to the higher domain node. Also, the higher domain node comprises plural domain proper number code nodes. The hierarchical structure can be extended more than three levels. Also, each node of the tree structure has a peculiar domain name.

FIG. 13 is a flowchart illustrating the process of moving data in the domain name server in the present invention.

Referring to FIG. 13, if the Internet user 102 wants to connect with the American singer Madonna's site, then the Internet user 102 clicks the logo icon comprising Madonna's facial picture. The Madonna logo icon is composed of the area classification code of the United States '03' 801, the service classification code of art '041' 803, and the proper number of Madonna '1256' 805.

When the Internet user 102 clicks the logo icon, the domain name server 107 receives the classification code corresponding to the logo icon('03-041-1256'). And the domain name server 107 transmits the query to connect the domain of the classification code '03-041-1256' to the root name server.

The root name server transmits the query for referencing the 03 name server to the domain name server 107.

The domain name server 107 transmits the query of connecting the domain of the classification code '03-041-1256' to the 03 name server with reference to the request of the root name server.

The 03 name server transmits the query of referencing the 03-041 name server to the domain name server 107.

The domain name server 107 transmits the query of connecting the domain of the classification code '03-041-1256' to the 03-041 name server with reference to the request of the 03 name server.

The 03-041 name server transmits the query of referencing the 03-041-1256 name server to the domain name server 107.

The domain name server 107 transmits the query of connecting the domain of the classification code '03-041-1256' to the 03-041-1256 name server with reference to the request of the 03-041 name server.

The 03-041-1256 name server connects with the domain of the classification code 03-041-1256 and transmits the IP address corresponding the classification code to the Internet user 102 through the domain name server 107. The Internet user 102 connects to Madonna's site by using the IP address.

FIG. 14 is a screen example illustrating a plug-in browser in the present invention.

Referring to FIG. 14, the browser provided with the domain requester 101 and the Internet user 102 can comprise the logo icon provided with the logo domain server 105. Also, the domain requester 101 and the Internet user 102 can add the logo icon of a frequently used site to the favorite list provided by the browser. For example, the domain requester 101 and the Internet user 102 can add the logo icon of a religion site frequently used to the favorite list by dragging. Also, the domain requester 101 and the Internet user 102 can update the updated logo icon of the logo domain server 105 by using the plug-in browser.

FIG. 15 is a screen example illustrating a plug-in browser of a mobile phone in the present invention.

Referring to FIG. 15, the present invention can be applied to both the wired Internet and the wireless Internet. Because the embodiment for using the mobile communication terminal is similar to that described above, that description would be omitted.

INDUSTRIAL APPLICABILITY

As described above, according to the present invention, the present invention can provide a logo domain hosting system and method for connecting with a desired site by selecting a logo directly understood.

Also, the present invention can provide a system and method for providing a global service regardless of language type, thereby not having any linguistic restriction.

Also, the present invention can provide a system and method for displaying a large amount of data without the spatial restriction of an Internet site browser.

Also, the present invention can provide a system and method for using a logo as a URL.

Also, the present invention can provide a system and method for connecting a web site by selecting an obvious logo icon on the mobile communications terminal.

What is claimed is:

1. A domain providing method, comprising the steps of:
   receiving a connection request signal from a domain requester;
   receiving a domain request signal comprising a logo from the connected domain requester;
   registering the logo as a logo domain; and
   transmitting a logo domain registration confirmation signal corresponding to the registered logo domain,
   wherein the logo is an image; and if the Internet user selects the logo domain, then the browser corresponding to the Internet user transmits a classification code corresponding to the selected logo domain to a domain name server, and the domain name server extracts an IP address corresponding to the classification code and transmits the IP address to the browser.

2. The method of claim 1, further comprising the steps of:
   creating the classification code by using the domain request signal, wherein the domain request signal further comprises domain open information and the classification code is created by using the domain open information; and
   connecting the classification code with the logo domain.

3. The method of claim 2, wherein the classification code comprises an identification number code.

4. The method of claim 3, wherein the classification code further comprises either an area classification code or a service classification code.

5. The method of claim 3, wherein the classification code further comprises a logo size classification code.

6. The method of claim 5, wherein the logo size classification code sets up a logo size.

7. The method of claim 2, wherein the classification code is assigned step by step.

8. The method of claim 2, wherein the domain open information further comprises either an area classification code or a service classification code.

9. The method of claim 2, wherein the classification code is uniquely connected with the logo domain.

10. The method of claim 2, wherein the classification code uses a supplementary mark corresponding to the classification code.

11. The method of claim 2, further comprising the step of creating a logo icon corresponding to the logo domain, the logo icon being provided to Internet users.

12. The method of claim 11, wherein the logo icon is provided to the Internet users by using a plug-in.

13. The method of claim 12, wherein an upgraded logo icon is provided to the Internet users by using the plug-in.

14. The method of claim 11, wherein the logo icon is displayed by using the user's private browser.

15. The method of claim 11, wherein the logo icon is displayed as wallpaper of an operating system.

16. The method of claim 11, wherein the logo icon comprises at least an identification and a password of the site, and when the user clicks the logo icon, the user logs into the site automatically.

17. The method of claim 11, wherein the logo icon is distributed widely to the Internet users in the Internet site.

18. The method of claim 17, wherein an updated logo icon is provided to the Internet users in the Internet site.

19. The method of claim 1, further comprising the step of storing the registered logo domain.

20. The method of claim 19, wherein the step of storing the registered logo domain is the step of storing the logo domain and the classification code.

21. The method of claim 1, wherein the image is either a two dimensional image or a three dimensional image.

22. The method of claim 1, wherein the domain request signal comprises the logo provided by the domain requester.

23. The method of claim 1, wherein the domain request signal comprises the logo selected by the domain requester in provided plural logos.

24. The method of claim 1, wherein to select the logo domain is to click a logo icon corresponding to the logo domain.

25. A browsing method, comprising the steps of:
    providing at least one logo icon to an Internet user;
    connecting the logo icon to correspond to a logo domain and classification code;
    extracting a classification code corresponding to the logo icon selected by the Internet user;
    transmitting the extracted classification code to a domain name server;
    receiving an IP address corresponding to the classification code from the domain name server; and
    connecting to the Internet site corresponding to the IP address,
    wherein the domain name server extracts the IP address corresponding to the received classification code.

26. The method of claim 25, further comprising the step of providing an updated logo icon for the Internet user.

27. The method of claim 26, wherein the updated logo icon is stored in storage.

28. The method of claim 25, wherein a favorites service is provided to the Internet user.

29. The method of claim 28, wherein the Internet user adds the logo icon to a list of the favorites service.

30. The method of claim 25, wherein the logo domain browsing method is executed on a wired network or wireless network.

31. A domain providing system, the system comprising:
    a storage device; and
    a processor coupled to the storage device,
    wherein the storage device stores a program for controlling the processor;
    wherein the processor is operative with the program to receive a connection request signal from a domain requester; receive a domain request signal comprising a logo from the connected domain requester;
    register the logo as a logo domain; and
    transmit a logo domain register confirmation signal corresponding to the registered logo domain, and
    wherein the logo is an image, and if the Internet user selects the logo domain, then the browser corresponding to the Internet user transmits the classification code corresponding to the selected logo domain to a domain name server, and the domain name server extracts an IP address corresponding to the classification code and transmits the IP address to the browser.

32. A recorded medium tangibly embodying a program of instructions executable by a digital processing apparatus to execute a logo domain browsing method, the recorded medium being readable by the digital processing apparatus, the program comprising:

providing at least one logo icon to an Internet user, such that the logo icon corresponds to a logo domain and is connected to a classification code;
allowing the internet user to select a logo icon;
extracting a classification code corresponding to the selected logo icon by the Internet user;
transmitting the extracted classification code to a domain name server;
receiving an IP address corresponding to the classification code from the domain name server; and
connecting to the Internet site corresponding to the IP address.

33. A domain providing method, comprising the steps of:
receiving a connection request signal from a domain requester;
receiving a domain request signal comprising a logo from a domain requester;
registering the logo as a logo domain which is connected with one classification code, the classification code being connected with an IP address;
receiving a classification code corresponding to the logo domain from the browser of an Internet user, such that when the Internet user selects the logo domain, the browser extracts the classification code corresponding to the logo domain;
extracting an IP address corresponding to the classification code; and
transmitting the IP address to the browser,
wherein the logo is an image, and the browser provides an Internet site corresponding to the IP address for the Internet user by using the IP address.

34. A domain providing system, the system comprising:
a storage device; and
a processor coupled to the storage device,
wherein the storage device stores a program for controlling the processor;
wherein the processor is operative with the program to receive a connection request signal from a domain requester; receive a domain request signal comprising a logo from the connected domain requester;
register the logo as a logo domain, such that the logo domain is connected with one classification code and the classification code is connected with an IP address;
receive a classification code corresponding to the logo domain from the browser of an Internet user, such that when the Internet user selects the logo domain, the browser extracts the classification code corresponding to the logo domain;
extract an IP address corresponding to the classification code; and
transmit the IP address to the browser, and
wherein the logo is an image, and the browser provides an Internet site corresponding to the IP address for the Internet user by using the IP address.

35. A domain providing method, comprising the steps of:
receiving a connection request signal from a domain requester;
receiving a domain request signal from the connected domain requester, such that the domain request signal comprises a logo;
registering the logo as a logo domain; and
transmitting a registration confirmation signal corresponding to the registered logo domain,
wherein the logo is an image, and if an Internet user selects the logo domain, then the browser corresponding to the Internet user converts the classification code corresponding to the selected logo into a uniform resource locator (URL) and transmits the URL to a domain name server and the domain name server extracts an IP address corresponding to the URL and transmits the IP address to the browser.

36. The method of claim 35, wherein the browser comprises a logo domain analysis utility.

37. The method of claim 36, wherein the logo domain analysis utility converts the classification code into the URL.

* * * * *